US006956464B2

(12) United States Patent
Wang et al.

(10) Patent No.: US 6,956,464 B2
(45) Date of Patent: Oct. 18, 2005

(54) POWER APPARATUS HAVING BUILT-IN POWERLINE NETWORKING ADAPTER

(75) Inventors: Cheng-Yu Wang, Hsinchu (TW); Chang-Yen Chiang, Kaohsiung (TW)

(73) Assignee: Abocom Systems, Inc., Hsinchu (TW)

( * ) Notice: Subject to any disclaimer, the term of this patent is extended or adjusted under 35 U.S.C. 154(b) by 26 days.

(21) Appl. No.: 10/605,908

(22) Filed: Nov. 5, 2003

(65) Prior Publication Data

US 2004/0228070 A1 Nov. 18, 2004

(30) Foreign Application Priority Data

May 14, 2003 (TW) .............................. 92208790 U

(51) Int. Cl.[7] ............................................ H04M 11/04

(52) U.S. Cl. ........................... 340/310.08; 340/310.01; 340/310.07; 340/635; 361/600

(58) Field of Search ...................... 340/310.07, 310.08, 340/310.01, 310.02, 538, 635, 333, 825.72; 307/38, 39, 40, 139, 140, 195, 116, 141; 200/50.28, 51.03, 51.08, 51 R; 361/600

(56) References Cited

U.S. PATENT DOCUMENTS

| | | | |
|---|---|---|---|
| 6,175,927 B1 * | 1/2001 | Cromer et al. .............. | 713/300 |
| 6,211,581 B1 * | 4/2001 | Farrant ....................... | 307/117 |
| 6,445,087 B1 * | 9/2002 | Wang et al. .................. | 307/40 |
| 6,741,162 B1 * | 5/2004 | Sacca et al. ........... | 340/310.01 |
| 6,744,150 B2 * | 6/2004 | Rendic ........................ | 307/38 |

* cited by examiner

*Primary Examiner*—Hung Nguyen
(74) *Attorney, Agent, or Firm*—Connolly Bove Lodge & Hutz LLP; Larry J. Hume

(57) ABSTRACT

A power apparatus having a built-in powerline networking adapter is revealed. This invented power adapter includes one electrical plug and one body. The electrical plug is purposed to connect a called powerline networking, for instance, the home powerline. The body includes at least one electrical outlet and one networking adapter. The at least electrical outlet is purposed to connect this electrical plug for power supply. This networking adapter connects this electrical plug to transport the signal and data packets along the powerline. The above power apparatus having a built-in powerline networking adapter is capable of utilizing one cable to connect the electrical plug and the body in order to undergo electrical conductivity and possess the function of power line lengthening and networking physical extension.

9 Claims, 5 Drawing Sheets

POWER APPARATUS HAVING BUILT-IN POWERLINE NETWORKING ADAPTER

BACKGROUND

The present invention is related to a power apparatus, more particularly, to a power apparatus having a built-in powerline networking adapter.

Recently, more and more attention has been paid on the technology of powerline networking used to transport data along power lines. For example, HomePlug Powerline Alliance is devoted to advance research of this technology and standardization of productivity.

The specification of HomePlug 1.0 protocol was announced in June 2001. The data rate of transporting data packets is up to 14 Megabit per second (Mbps) and approaches the high data rate of Asymmetric Digital Subscriber Line (ADSL).

If a computer or printer is appended into a local area network (LAN), the existing power lines are possibly utilized to play a communication medium for data transportation by the aid of powerline networking technology. The convenience of this technology will reduce the cost profoundly without any additional expense on hardware investment, and possess functional analogy of plug-and-play.

As shown in FIG. 1, the current retail product of powerline networking adapter 10 is used to insert a power networking. For instance, the home power outlet 12 and the bottom of this powerline networking adapter 10 connect to one end of an Ethernet cable 14. The other end of the Ethernet cable 14 is capable of connecting to one computer or printer of LAN equipments for data transportation.

A family room usually provides two power outlets 12. Thus, this powerline networking adapter 10, which occupies one of the power outlets 12, will share the resource of power outlets and cause inconvenient. Furthermore, the LAN equipment has connecting difficulty if its position is far away from the power outlets 12.

BRIEF SUMMARY

The objective of the present invention is to provide a power apparatus having a built-in powerline networking adapter, which provides the functions of LAN connection and electrical power transportation. These functions increase the usage convenience of LAN equipments. Furthermore, the present invented power apparatus having a built-in powerline networking adapter is designed as a form of cable extension to benefit for power transportation.

The present invented power apparatus having a built-in powerline networking adapter includes one electrical plug and one body. The purpose of the electrical plug is to connect a powerline networking, for instance, the home powerline. The body includes at least one electrical outlet and one networking adapter. The electrical outlet connects this electrical plug for forwarding power to electrical equipments. The networking adapter connects this electrical plug to transport the signal and data packets along the powerline.

This networking adapter comprises one transformer, one analog and digital conversion unit (analog/digital converter), one powerline networking chipset and at least one networking outlet. The transformer connects this electrical plug and is used to decrease voltage magnitude of the powerline networking. This powerline networking chipset will convert digitized signals and data packets. This networking outlet is capable of connecting at least one networking equipment to be a transferring interface of data packets.

The above power apparatus having a built-in powerline networking adapter is capable of utilizing one cable to connect this electrical plug and the body in order to undergo electrical conductivity and possess the function of powerline lengthening and networking physical extension.

DETAILED DESCRIPTION

Figure 1:
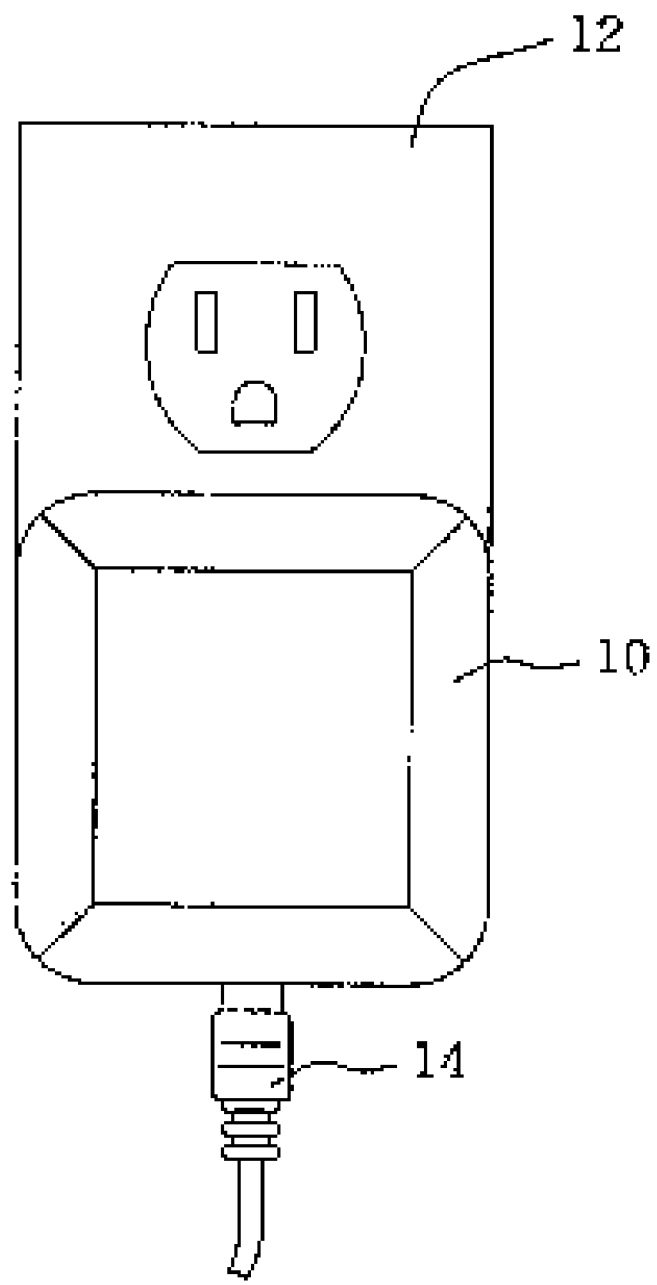
FIG. 1 is a diagram of used powerline networking adapter.
Figure 2:
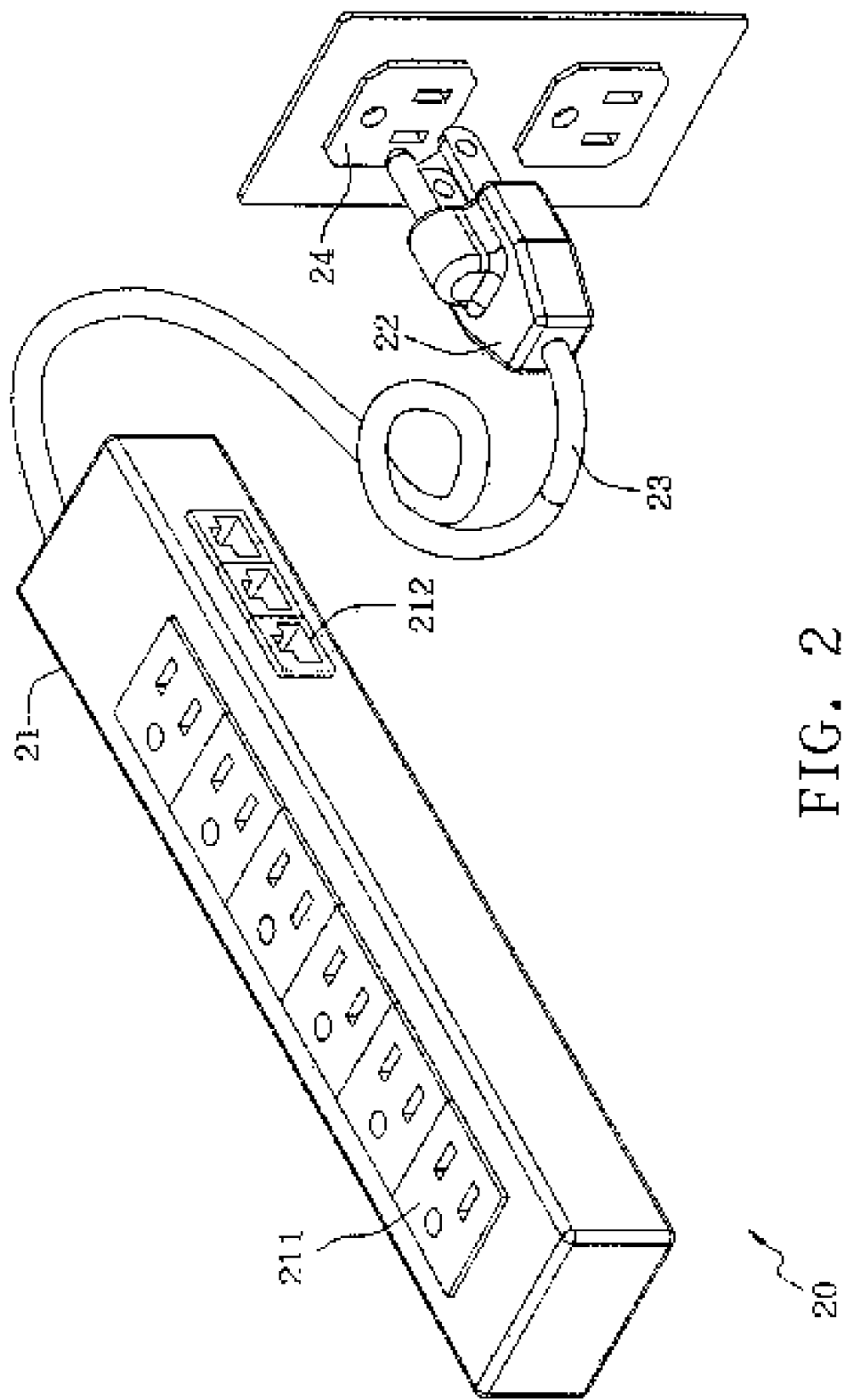
FIG. 2 is an outline diagram of the present invented power apparatus having a built-in powerline networking adapter.

FIG. 2 discloses the present invented power apparatus having a built-in powerline networking adapter 20. It includes one body 21, one electrical plug 22 and one cable 23. The body 21 includes six electrical outlets 211 and three networking outlets 212. The electrical outlets 211, which provide the function of powerline extension, offer power supply not only for a computer or printers, but also for electrical fans, desk lights and regular electrical devices. The networking outlets 212 are capable of connecting networking equipments of computers and printers for data transportation. One end of this cable 23 connects the body 21, and the other end connects the electrical plug 22. The electrical plug 22 is inserted into one home electrical outlet 24 for obtaining alternative current (AC) power to this body 21 for supporting data transportation. From the outline point of view, this power apparatus having a built-in powerline networking adapter 20 resembles a traditional extensive power line by adding a design of networking outlets 212.

Figure 3:
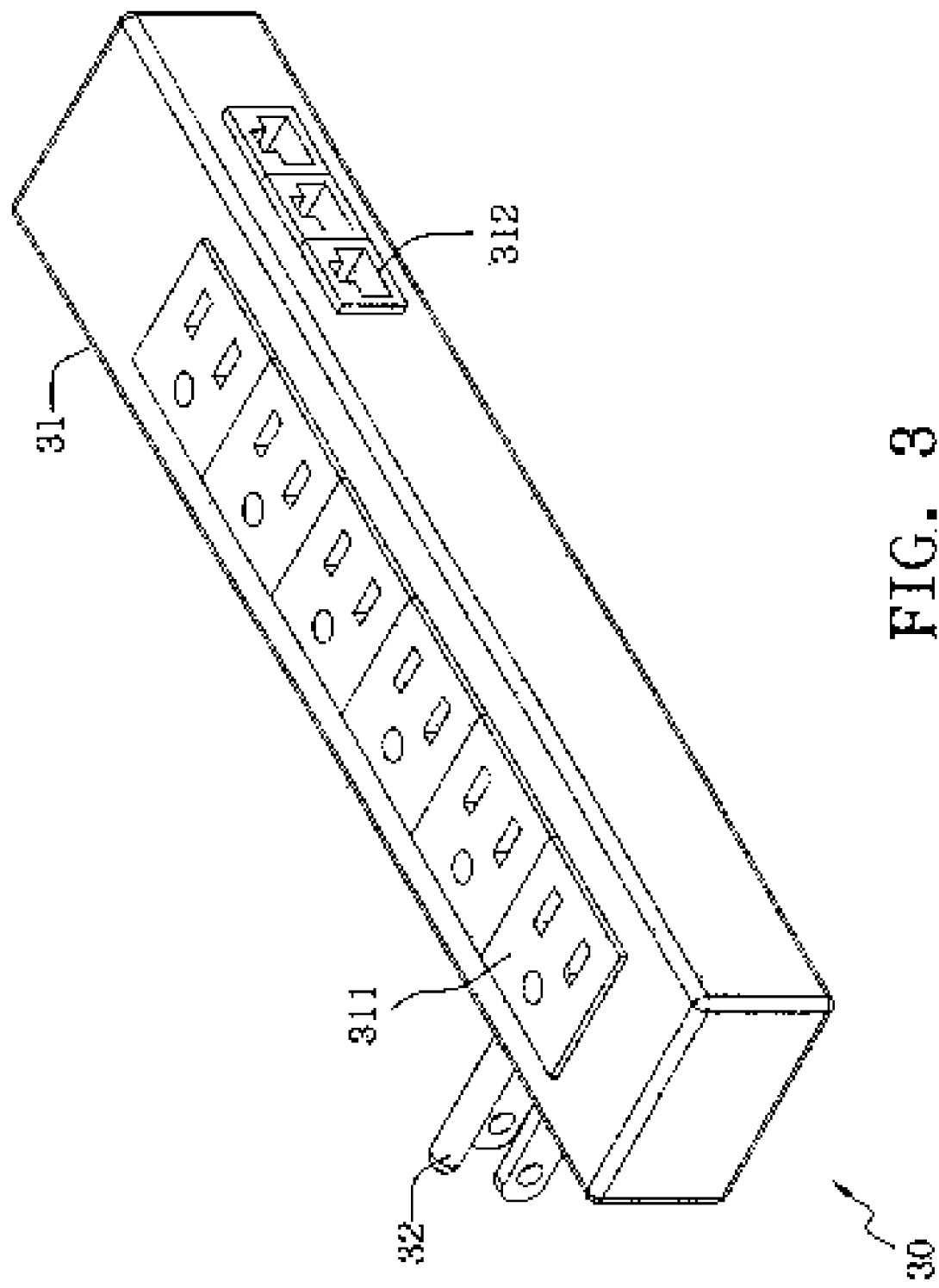
FIG. 3 is an outline diagram of another present invented power apparatus having a built-in powerline networking adapter.

In case of unnecessary cable-extension function, the present invention discloses another power apparatus having a built-in powerline networking adapter as illustrated in FIG. 3. A power apparatus having a built-in powerline networking adapter 30 is to connect one electrical plug 32 to one side of one body 31. This body 31 includes electrical outlets 311 and powerline networking adapter 312 to offer both functions of power supply and networking connection.

Figure 4:
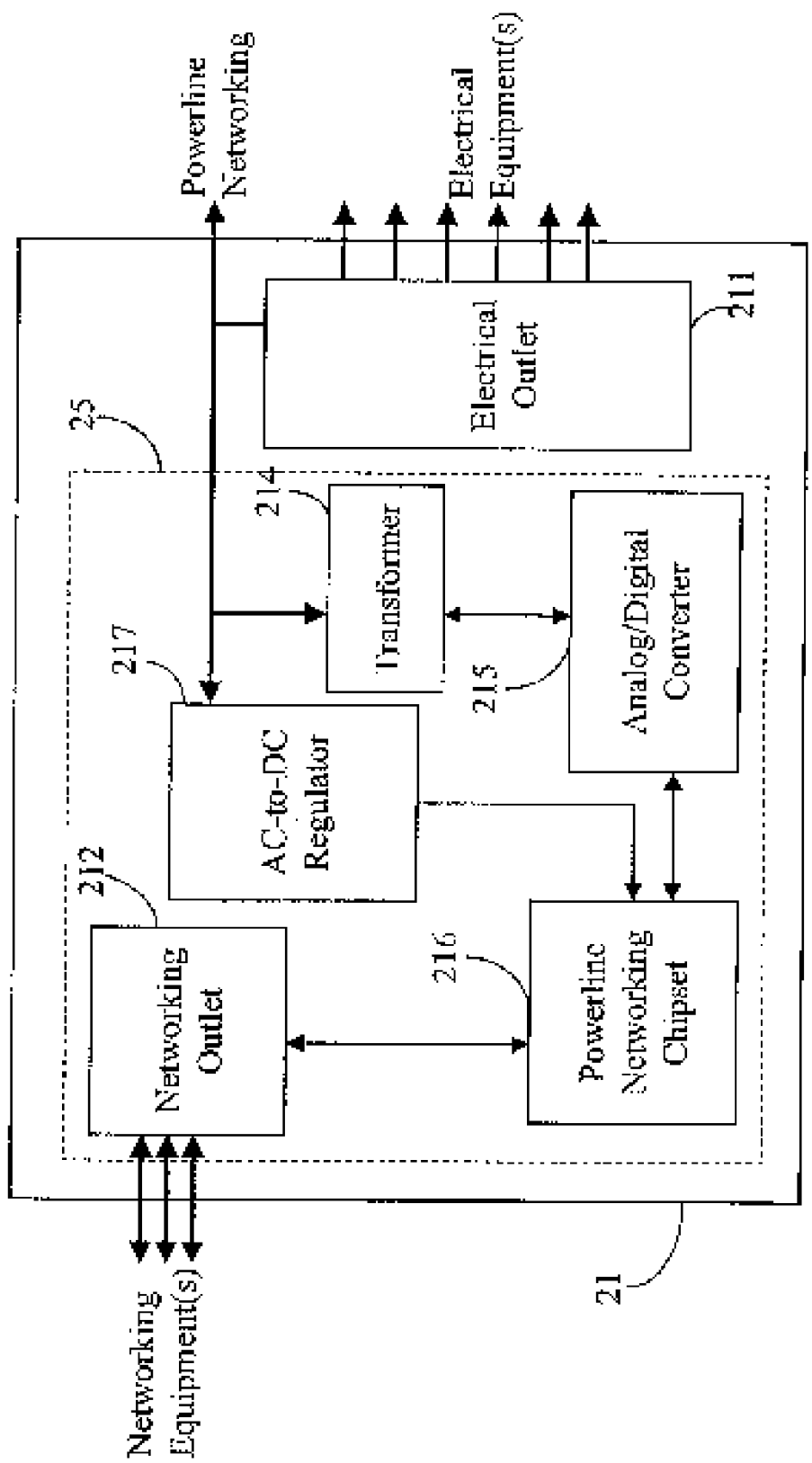
FIG. 4 is a functional block diagram of the present invented power apparatus having a built-in powerline networking adapter.

FIG. 4 discloses two functional block diagrams of the present invented power apparatus having built-in powerline networking adapters 20 and 30. The body 21 includes electrical outlets 211 and one powerline networking adapter 25. This powerline networking adapter 25 comprises one transformer 214, one analog/digital converter 215, one powerline networking chipset 216, one AC-to-DC regulator 217 and networking outlets 212. The electrical outlets 211 connect to a powerline networking, for instance, a home powerline networking, to offer AC power to every electrical equipment. This analog/digital converter 215 is designed for analog-to-digital (A/D) or digital-to-analog (D/A) conversion. The data signals transported through powerline networking are down to a proper voltage level for data networking by the aid of transformer 214. The proper voltage level for data networking may be, for instance, 3.3V, 5V, 12V and so on. These data signals down to a proper level for data networking are further converted by the analog/digital converter 215 for subsequent digital processing. The converted data signal is then processed as data packets by this powerline networking chipset 216 and conducts into networking equipments through networking outlets 212. Conversely, these networking equipments are capable of transmitting data sequentially from networking outlets 212, the powerline networking chipset 216, the analog/digital converter 215 and the transformer 214 to output analog signals. These analog signals are able to transport in power lines of powerline networking. It should be noted that this analog/digital converter 215 functions as D/A and A/D conversions and the transformer 214 is responsible for voltage transformation.

Figure 5:
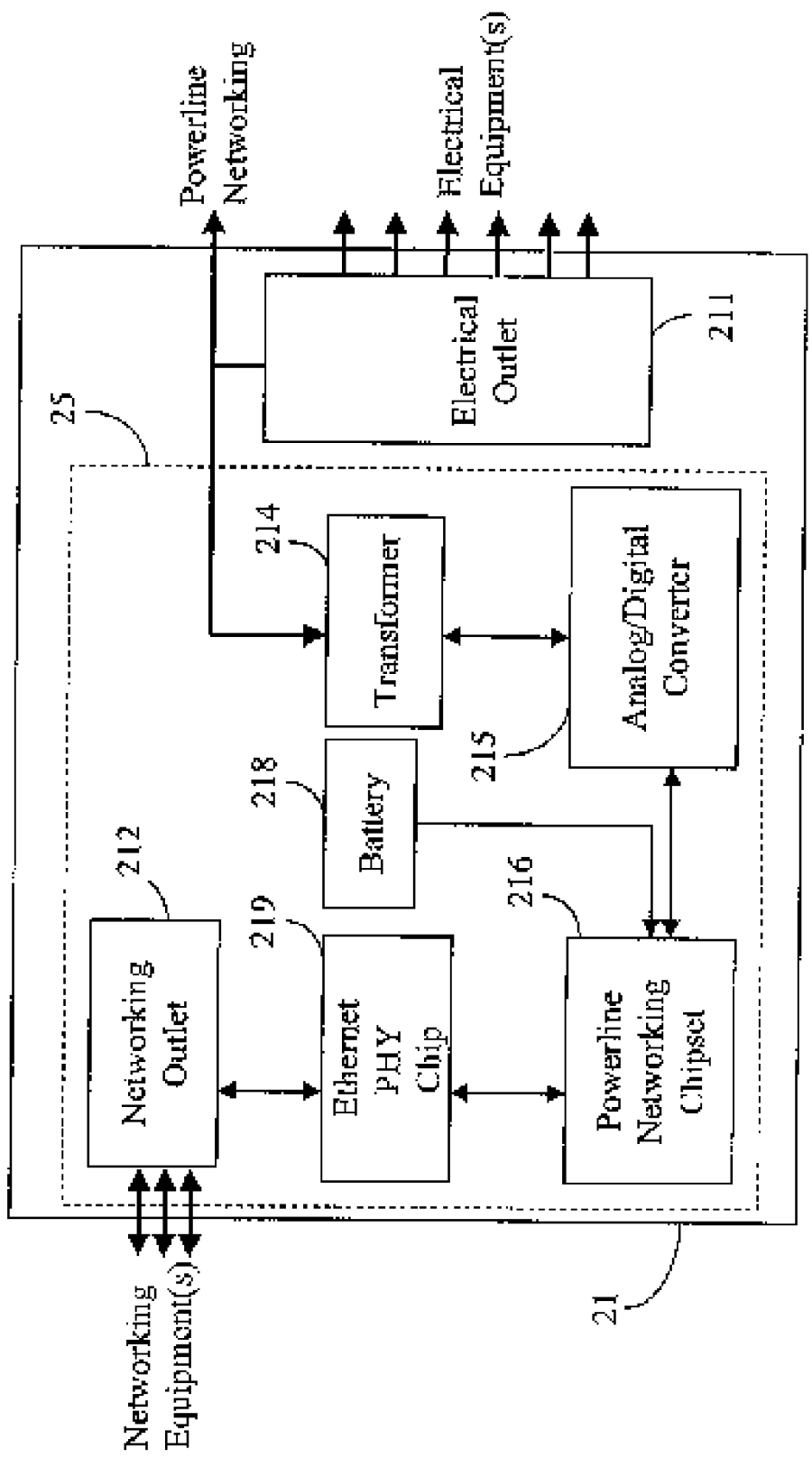
FIG. 5 is another functional block diagram of the present invented power apparatus having a built-in powerline networking adapter.

As shown in FIG. 5, if the networking outlets 212 are of RJ45 types, the body 21 is capable of including an additional Ethernet chip 219 called Ethernet Physical Layer (Ethernet PHY) to process data packets in compliance with the specification of connector type RJ45 of Open System Interconnection (OSI) issued by International Standard Organization (ISO). Furthermore, this AC-to-DC regulator 217 is possibly replaced by a battery 218 to offer DC power supply to the powerline networking chip 216.

In case of a cable of Wide-Area-Network (WAN), for instance, ADSL or broadband cable modem, being used at home, there is no need to set up any networking equipment, but it is only necessary to utilize electrical outlets only in the rooms to share networking resource by the aid of the power apparatus of the present invention having a built-in powerline networking adapter 20 or 30.

The present invention of power apparatus having a built-in powerline networking adapter is not limited to home power resource of usage. In general, people in offices and factories with electrical outlets of powerline networking can use the power apparatus having a built-in powerline networking adapter of the present invention.

The above-described embodiments of the present invention are intended to be illustratively only. Numerous alternative embodiments may be devised by those skilled in the art without departing from the scope of the following claims.

What is claimed is:

1. A power apparatus having a built-in powerline networking adapter, comprising:
   an electrical plug for being connected to a powerline networking; and
   a body, comprising:
      at least one electrical outlet electrically connected to the electrical plug; and
      a networking adapter electrically connected to the electrical plug for performing a transformation between signals of the powerline networking and data packets,
   wherein the networking adapter comprises:
      a transformer electrically connected to the electrical plug for decreasing voltages of the signals of the powerline networking;
      an analog/digital converter for digitizing the voltage-decreased signals;
      a powerline networking chipset for performing a transformation between the digitized signals and the data packets; and
      at least one networking outlet for being in connection with at least one networking equipment and acting an interface for transferring the data packets.

2. The power apparatus having a built-in powerline networking adapter in accordance with claim 1, further comprising a cable whose two ends respectively connect to the electrical plug and the body for electrical conduction.

3. The power apparats having a built-in powerline networking adapter in accordance with claim 1, wherein the powerline networking is a home powerline networking.

4. The power apparatus having a built-in powerline networking adapter in accordance with claim 1, wherein the networking outlet is of RJ45 type.

5. The power apparatus having a built-in powerline networking adapter in accordance with claim 1, further comprising an AC-to-DC regulator for transforming AC power of the powerline networking into DC power so as to provide power for the powerline networking chipset.

6. The power apparatus having a built-in powerline networking adapter in accordance with claim 1, further comprising a battery for providing DC power to the powerline networking chipset.

7. The power apparatus having a built-in powerline networking adapter in accordance with claim 1, wherein the networking adapter further comprises a chip of Ethernet Physical Layer.

8. The power apparatus having a built-in powerline networking adapter in accordance with claim 1, wherein the analog/digital converter is used to analogize output signals of the powerline networking chipset.

9. The power apparatus having a built-in powerline networking adapter in accordance with claim 1, wherein the transformer is used to raise voltages of the signals of the analog/digital converter.

* * * * *